United States Patent [19]

Prabhu et al.

[11] Patent Number: 4,467,009

[45] Date of Patent: Aug. 21, 1984

[54] INDIUM OXIDE RESISTOR INKS

[75] Inventors: Ashok N. Prabhu, Plainsboro; Kenneth W. Hang, Princeton Junction, both of N.J.

[73] Assignee: RCA Corporation, New York, N.Y.

[21] Appl. No.: 459,754

[22] Filed: Jan. 21, 1983

[51] Int. Cl.[3] ........................ B32B 3/00; B32B 17/00; H01C 1/012

[52] U.S. Cl. .................................... 428/210; 338/308; 427/102; 428/433; 428/689; 428/702; 428/901; 501/20; 501/21

[58] Field of Search ............... 428/210, 209, 433, 432, 428/689, 702, 901; 427/102, 101; 252/521; 501/20, 21; 338/308; 174/68.5

[56] References Cited

U.S. PATENT DOCUMENTS

| | | | |
|---|---|---|---|
| 3,411,947 | 11/1968 | Block et al. | 428/433 |
| 4,045,764 | 8/1977 | Ichinose et al. | 252/521 X |
| 4,065,743 | 12/1977 | Wahlers et al. | 427/102 X |
| 4,172,922 | 10/1979 | Merz et al. | 428/432 |
| 4,256,796 | 3/1981 | Hang et al. | 428/210 |
| 4,369,220 | 1/1983 | Prabhu et al. | 428/209 |
| 4,369,254 | 1/1983 | Prabhu et al. | 501/21 |
| 4,376,725 | 3/1983 | Prabhu et al. | 252/521 X |
| 4,377,642 | 3/1983 | Prabhu et al. | 501/20 |
| 4,379,195 | 4/1983 | Prabhu et al. | 428/209 |
| 4,380,750 | 4/1983 | Prabhu et al. | 338/308 |
| 4,399,320 | 8/1983 | Prabhu et al. | 174/68.5 |
| 4,401,709 | 8/1983 | Prabhu et al. | 427/101 X |

*Primary Examiner*—Thomas J. Herbert
*Attorney, Agent, or Firm*—Birgit E. Morris; R. Hain Swope

[57] ABSTRACT

Improved medium and high value resistor inks are disclosed. The subject inks comprise indium oxide, a barium calcium borosilicate glass frit, a suitable organic vehicle and a temperature coefficient of resistance modifier selected from the group consisting of ferric oxide and vanadium oxide.

19 Claims, No Drawings

INDIUM OXIDE RESISTOR INKS

This invention pertains to indium oxide resistor inks having an improved temperature coefficient of resistance.

BACKGROUND OF THE INVENTION

The use of specialized ink formulation to form thick films having various functions on suitable substrates in the construction of multilayer circuits is known. We have developed medium and high value thick film resistor inks based on indium oxide and containing magnesium oxide as a temperature coefficient of resistance modifier. These inks and their preparation are disclosed in our copending U.S. patent application, Ser. No. 280,934, filed July 6, 1981, now U.S. Pat. No. 4,380,750, issued Apr. 19, 1983 the disclosure of which is incorporated herein by reference.

The subject inks are compatible with conventional substrates and are particularly suited for use with porcelain-coated metal substrate for circuit fabrication which are disclosed in Hang et al., U.S. Pat. No. 4,256,796, issued Mar. 17, 1981, the disclosure of which is incorporated herein by reference. The subject inks are also compatible with inks having various other functions which are formulated for use on the Hang et al. substrates.

The subject inks are medium and high value resistor inks, i.e. they are formulated to have resistance values of from 500 to one million ohms per square. The subject inks are characterized by a stable temperature coefficient of resistance (TCR) at both ends of this range.

SUMMARY OF THE INVENTION

The improved resistor inks provided in accordance with this invention comprise indium oxide, a barium calcium borosilicate glass frit, vanadium oxide as a modifier to raise the TCR or ferric oxide as a modifier to lower the TCR, and a suitable organic vehicle.

DETAILED DESCRIPTION OF THE INVENTION

In accordance with this invention, there are provided improved medium and high value resistor inks of high reliability which are useful in the production of complex single- or multilayer thick-film circuits on porcelain-coated metal circuit boards. While the resistor inks of this invention are particularly useful in connection with circuits formed on the Hang et al. porcelain-coated metal boards, they can be effectively utilized with conventional boards presently available, e.g. alumina boards. While the range of resistance values which constitutes medium and high value resistance is somewhat arbitrary, those skilled in the art generally consider it to be between about 500 and one million ohms/square. It has been found in accordance with this invention that the TCR values for both the upper and lower end of this range could be stabilized and brought within acceptable limits by the addition thereto of certain TCR modifiers.

Formulations of the subject inks in the lower end of this range, i.e. those having resistance values from about 500 to about 5,000 ohms per square, have positive TCR values, i.e. from about 600 to 300 ppm/°C. Such levels are unacceptable. It has been found in accordance with this invention that the addition of ferric oxide to such inks substantially lowers these values, bringing them within acceptable limits of plus or minus 200 ppm/°C. and, preferably, close to zero. Above resistance values of about 50,000 ohms per square, the TCR values of the subject inks change from positive to negative. Ferric oxide would not be added to such inks.

Formulations of the subject inks having a negative TCR value, i.e. those inks having a sheet resistance of from about 50,000 to one million ohms/square and above, contain vanadium oxide to raise the TCR and bring it as close to zero as possible. In accordance with this invention, either vanadium oxide or ferric oxide is added to the subject inks in from about 0.1 to about 10, preferably from about 1 to about 5, percent by weight.

The presence of vanadium oxide in the subject inks is advantageous over magnesium oxide, utilized in our copending application as a TCR controlling component, in two particulars. First, a comparable increase in TCR can be obtained with substantially less vanadium oxide than magnesium oxide. Second, and more important, vanadium oxide changes the properties of the indium oxide, whereas magnesium oxide exerts its effect by entering into and partially devitrifying the glass frit. Magnesium oxide, therefore, changes physical properties of the glass, such as surface tension and viscosity, which adversely affects the compatibility of the film formed from the ink with the circuit board, particularly the porcelain-coated metal boards of Hang et al.

In contrast, vanadium oxide dopes the indium oxide at temperatures below the softening point of the glass and is absorbed into the glass to only a relatively small degree. Therefore, it does not adversely affect the compatibility of the film with the circuit board. Ferric oxide also does not adversely affect the subject glass frits, although it is not certain whether it acts on the glass frit, indium oxide or both. it will be appreciated, therefore, that the effectiveness of both modifiers, particularly vanadium oxide, will be substantially reduced were they to be incorporated into the glass frit instead of the ink.

The indium oxide should be of high purity and, preferably, have a mean particle size of between about 1.0 and 1.2 micrometers. Indium oxide comprises from about 25 to about 80 percent, preferably from about 30 to about 45 percent, by weight, of the subject inks.

The barium calcium borosilicate glass frit of the novel inks of this invention consists of, on a weight basis:

(a) from about 40 to about 55 percent, preferably about 52 percent, of barium oxide;

(b) from about 10 to about 15 percent, preferably about 12 percent, of calcium oxide;

(c) from about 14 to about 25 percent, preferably about 19 percent, of boron trioxide; and (d) from about 13 to about 23 percent, preferably about 17 percent, of silicon dioxide. The glass frit powder comprises from about 5 to about 60 percent, preferably from about 30 to about 45 percent, by weight, of the subject inks.

The term "vanadium oxide" as utilized herein includes both vanadium trioxide, $V_2O_3$ and vanadium pentoxide, $V_2O_5$.

The organic vehicles are binders such as, for example, cellulose derivatives, particularly ethyl cellulose, synthetic resins such as polyacrylates or methacrylates, polyesters, polyolefins and the like. In general, conventional vehicles utilized in inks of the type described herein may be used in the subject inks. Preferred commercially available vehicles include, for example, pure liquid polybutenes available as Amoco H-25, Amoco H-50, and Amoco L-100 from Amoco Chemicals Corporation, poly n-butylmethacrylate available from E. I. duPont de Nemours and Co., and the like.

The above resins may be utilized individually or in any combination of two or more. A suitable viscosity modifier can be added to the resin material if desired. These modifiers can be solvents such as those conventionally used in similar ink compositions, e.g., pine oil, terpineol, butyl carbitol acetate, an ester alcohol available from Texas Eastman Company under the trademark Texanol and the like, or solid materials such as, for example, a castor oil derivative available from N.L. Industries under the trademark Thixatrol. The organic vehicle comprises from about 10 to about 35 percent by weight, preferably from about 20 to about 30 percent by weight, of the subject inks.

The improved resistor inks of this invention are applied to the substrate board, e.g., conventional alumina boards or the improved porcelain-coated metal boards of Hang et al., by conventional means, i.e., screen printing, brushing, spraying, and the like, with screen printing being preferred. The coating of ink is then dried in air at 100°-125° C. for about 15 minutes. The resulting film is then fired in nitrogen at peak temperatures of from 850° to 950° C. for from 4 to 10 minutes. As is conventional in the art, the subject resistor inks are generally applied and fired on the substrate board after all conductor inks have been applied and fired. The resistor values of the fired films can be adjusted by conventional means such as laser trimming or air abrasive trimming. In addition to excellent TCR values at both ends of the medium to high value range, films formed from the subject resistor inks have demonstrated superior current noise, laser trimmability and stability to the effects of thermal shock, solder dipping, thermal storage, power loading and humidity. They also demonstrate excellent chemical compatibility with the Hang et al. porcelain-coated metal boards and films formed from inks specifically developed therefor.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

Resistor inks having resistance values in the low end of the medium to high range were prepared from the following formulations:

| | Percent | | |
|---|---|---|---|
| Ingredient | A | B | C |
| Indium Oxide | 45.45 | 44.44 | 44.95 |
| Ferric Oxide | — | 2.22 | 1.12 |
| Glass Frit | 25.00 | 17.78 | 22.47 |
| Vehicle | 29.55 | 35.56 | 31.46 |

In the above formulations, the glass powder had the following percent composition: BaO(51.32); CaO (12.51); $B_2O_3$ (19.42); and $SiO_2$ (16.75). The vehicle was a 6 percent solution of ethyl cellulose in the ester alcohol vehicle Texanol.

The powder ingredients were combined with the organic vehicle, initially mixed by hand and then on a 3 roll mill with shearing to obtain a smooth paste suitable for screen printing. Additional vehicle was added to replace loss during mixing and to assure proper rheology.

Copper conductor inks were applied and fired onto a porcelain-coated steel substrate of the type described by Hang et al. The above inks were then printed onto the substrate using a 325 mesh stainless steel screen, 0.3-0.6 mil thick emulsion, dried in air at 125°±10° for about 15 minutes and fired in nitrogen at a peak temperature of 900°±10° for 4-7 minutes at peak temperature. The sheet resistivity and hot TCR of the resistors were determined. The results are reported in Table I.

TABLE I

| Ink Formulation | Sheet Resistivity (KΩ/□) | Hot TCR (+25° to +125° ppm/°C. |
|---|---|---|
| A | 5.08 | +413 |
| B | 3.15 | −444 |
| C | 2.70 | +74 |

The results in Table I demonstrate the TCR lowering effect and control obtainable in accordance with this invention. Formulation B contains an excess of ferric oxide and, therefore, the hot TCR is substantially into the negative range. Adjusting the amount of ferric oxide as in Formulation C produces a TCR value well into the acceptable range of plus or minus 200 ppm/°C.

EXAMPLE 2

Resistor inks having resistance values in the upper end of the high value range were prepared from the following formulations according to the procedure of Example 1.

| | Percent | | | |
|---|---|---|---|---|
| Ingredient | A | B | C | D |
| Indium Oxide | 37.04 | 35.12 | 35.71 | 35.71 |
| Vanadium Trioxide | — | — | — | 1.79 |
| Vanadium Pentoxide | — | 3.51 | 1.79 | — |
| Glass Frit | 33.33 | 31.54 | 32.14 | 32.14 |
| Vehicle | 29.63 | 29.83 | 30.36 | 30.36 |

The glass frit and vehicle were as in Example 1. The inks were screened and fired as in Example 1 and the sheet resistivities and hot TCR values determined. The results are given in Table II.

TABLE II

| Ink Formulation | Sheet Resistivity (KΩ/□) | Hot TCR (+25° to +125° ppm/°C.) |
|---|---|---|
| A | 411.3 | −414 |
| B | 597.3 | +51 |
| C | 255 | +130 |
| D | 138.7 | +214 |

The results in Table II demonstrate the capacity of vanadium oxide to raise the TCR values of the subject inks. The results indicate that vanadium trioxide, although more efficacious than vanadium pentoxide, also has a slight effect on sheet resistivity. All films demonstrated excellent thermal stability.

We claim:

1. A circuit board having on a portion of the surface thereof a coating of an improved resistor ink comprising:

(a) from about 25 to about 80 percent by weight of indium oxide;

(b) from about 5 to about 60 percent by weight of a barium calcium borosilicate glass frit;

(c) from about 10 to about 35 percent by weight of a suitable organic vehicle; and (d) from about 0.1 to about 10 percent by weight of a temperature coefficient of resistance modifier selected from the group consisting of vanadium oxide and ferric oxide.

2. A circuit board in accordance with claim 1, wherein said board is porcelain-coated metal.

3. A circuit board in accordance with claim 2, wherein said metal is steel.

4. An electronic assembly comprising a circuit board having a circuit thereon, said circuit containing a resistor film formed by applying and firing a resistor ink comprising:

(a) from about 25 to about 80 percent by weight of indium oxide;

(b) from about 5 to about 60 percent by weight of a barium calcium borosilicate glass frit;

(c) from about 10 to about 35 percent by weight of a suitable organic vehicle; and (d) from about 0.1 to about 10 percent by weight of a temperature coefficient of resistance modifier selected from the group consisting of vanadium oxide and ferric oxide.

5. An electronic assembly in accordance with claim 4, wherein said modifier is present in said ink in an amount of from about 1 to about 5 percent by weight.

6. An electronic assembly in accordance with claim 4, wherein said resistor film has a resistance value between about 50,000 and 1 million ohms per square and said modifier is vanadium oxide.

7. An electronic assembly in accordance with claim 4, wherein said resistor film has a resistance value between about 500 and 5,000 ohms per square and said modifier is ferric oxide.

8. An electronic assembly in accordance with claim 4, wherein said circuit board is porcelain-coated metal.

9. An electronic assembly in accordance with claim 8, wherein said metal is steel.

10. In a resistor ink suitable for forming a resistor film on a circuit board comprising:

(a) from about 25 to about 80 percent by weight of indium oxide;

(b) from about 5 to about 60 percent by weight of a barium calcium borosilicate glass frit; and (c) from about 10 to about 35 percent by weight of a suitable organic vehicle;

the improvement wherein said ink contains from about 0.1 to about 10 percent by weight of a temperature coefficient of resistance modifier selected from the group consisting of vanadium oxide and ferric oxide.

11. An improved resistor ink in accordance with claim 10, wherein said ink comprises from about 30 to about 45 percent by weight of indium oxide, from about 30 to about 45 percent by weight of said glass frit, from about 20 to about 30 percent by weight of said vehicle and from about 1 to about 5 percent by weight of said modifier.

12. An improved resistor ink in accordance with claim 10, wherein said glass frit consists of: from about 40 to about 55 percent by weight of barium oxide; from about 10 to about 15 percent by weight of calcium oxide, from about 14 to about 25 percent by weight of boron trioxide; and from about 13 to about 23 percent by weight of silicon dioxide.

13. An improved resistor ink in accordance with claim 12, wherein said glass frit consists of about 52 percent by weight of barium oxide, about 12 percent by weight of calcium oxide, about 19 percent by weight of boron trioxide, and about 17 percent by weight of silicon dioxide.

14. An improved resistor ink in accordance with claim 10, wherein said modifier is added to lower the temperature coefficient of resistance and said modifier is ferric oxide.

15. An improved resistor ink in accordance with claim 14, wherein the resistance value of a film formed therefrom is between about 500 and 5,000 ohms per square.

16. An improved resistor ink in accordance with claim 10, wherein said modifier is added to raise the temperature coefficient of resistance, and said modifier is vanadium oxide.

17. An improved resistor ink in accordance with claim 16, wherein the resistance value of a film formed therefrom is between about 50,000 and 1 million ohms per square.

18. An improved resistor ink in accordance with claim 16, wherein said vanadium oxide is vanadium trioxide.

19. An improved resistor ink in accordance with claim 16, wherein said vanadium oxide is vanadium pentoxide.

* * * * *